US005411666A

United States Patent [19]
Hollis et al.

[11] Patent Number: 5,411,666
[45] Date of Patent: May 2, 1995

[54] METHODS FOR REMOVING BIOFILM FROM OR PREVENTING BUILDUP THEREOF ON SURFACES IN INDUSTRIAL WATER SYSTEMS

[75] Inventors: C. George Hollis; John P. Terry; Percy A. Jaquess, all of Germantown, Tenn.

[73] Assignee: Buckman Laboratories International, Inc., Memphis, Tenn.

[21] Appl. No.: 215,653

[22] Filed: Mar. 22, 1994

Related U.S. Application Data

[63] Continuation of Ser. No. 654,007, Feb. 12, 1991, abandoned.

[51] Int. Cl.⁶ .............................................. C02F 1/50
[52] U.S. Cl. .................................... 210/632; 210/764; 162/161
[58] Field of Search .................... 210/606, 632, 764; 162/161

[56] References Cited

U.S. PATENT DOCUMENTS

| | | | |
|---|---|---|---|
| 3,519,379 | 7/1970 | Blomeyer et al. | 8/111 |
| 3,773,623 | 11/1973 | Hatcher et al. | 162/161 |
| 3,824,184 | 7/1974 | Hatcher et al. | 210/1 |
| 3,959,328 | 5/1976 | Buckman et al. | 252/8.1 |
| 3,985,686 | 10/1976 | Barrat | 252/547 |
| 4,054,542 | 10/1977 | Buckman et al. | 210/54 |
| 4,055,467 | 10/1977 | Christensen et al. | 162/161 |
| 4,285,765 | 8/1981 | Pera et al. | 162/161 |
| 4,370,199 | 1/1983 | Orndorff | 162/161 |
| 4,670,179 | 6/1987 | Inamorato et al. | 252/174 |
| 4,684,469 | 8/1987 | Pedersen et al. | 210/632 |
| 4,936,994 | 6/1990 | Wiatr | 210/632 |

FOREIGN PATENT DOCUMENTS

| | | |
|---|---|---|
| 0146022 | 6/1985 | European Pat. Off. . |
| 0201017 | 11/1986 | European Pat. Off. . |
| 0388115 | 9/1990 | European Pat. Off. . |
| 2137076 | 12/1972 | France . |
| 2065689 | 7/1981 | United Kingdom . |
| 2178055 | 2/1987 | United Kingdom . |
| WO90/02794 | 3/1990 | WIPO . |

OTHER PUBLICATIONS

Argo, David G. et al., Aqua Sci. Tech. Rev., "Biological Fouling of Reverse Osmosis Membranes", vol. 6, 1982, pp. 481–491.

Whittaker, C. et al., applied and Environmental Microbiology, "Evaluation of Cleaning Strategies for Removal of Biofilms from Reverse-Osmosis Membranes" vol. 48(2), Aug. 1984, pp. 395–403.

Fletcher, Madilyn et al., Applied and Environmental Microbiology "Influence of Substratum Characteristics on the Attachment of a Marine Pseudomonad to Solid Surfaces", Jan. 1989, pp. 67–72.

*Primary Examiner*—Thomas Wyse
*Attorney, Agent, or Firm*—Finnegan, Henderson, Farabow, Garrett & Dunner

[57] ABSTRACT

A composition for and methods of removing biofilm and controlling its development in industrial water systems. The water in such systems is treated with a combination of at least two biologically produced enzymes and a surface active agent, preferably an anionic surfactant.

25 Claims, 2 Drawing Sheets

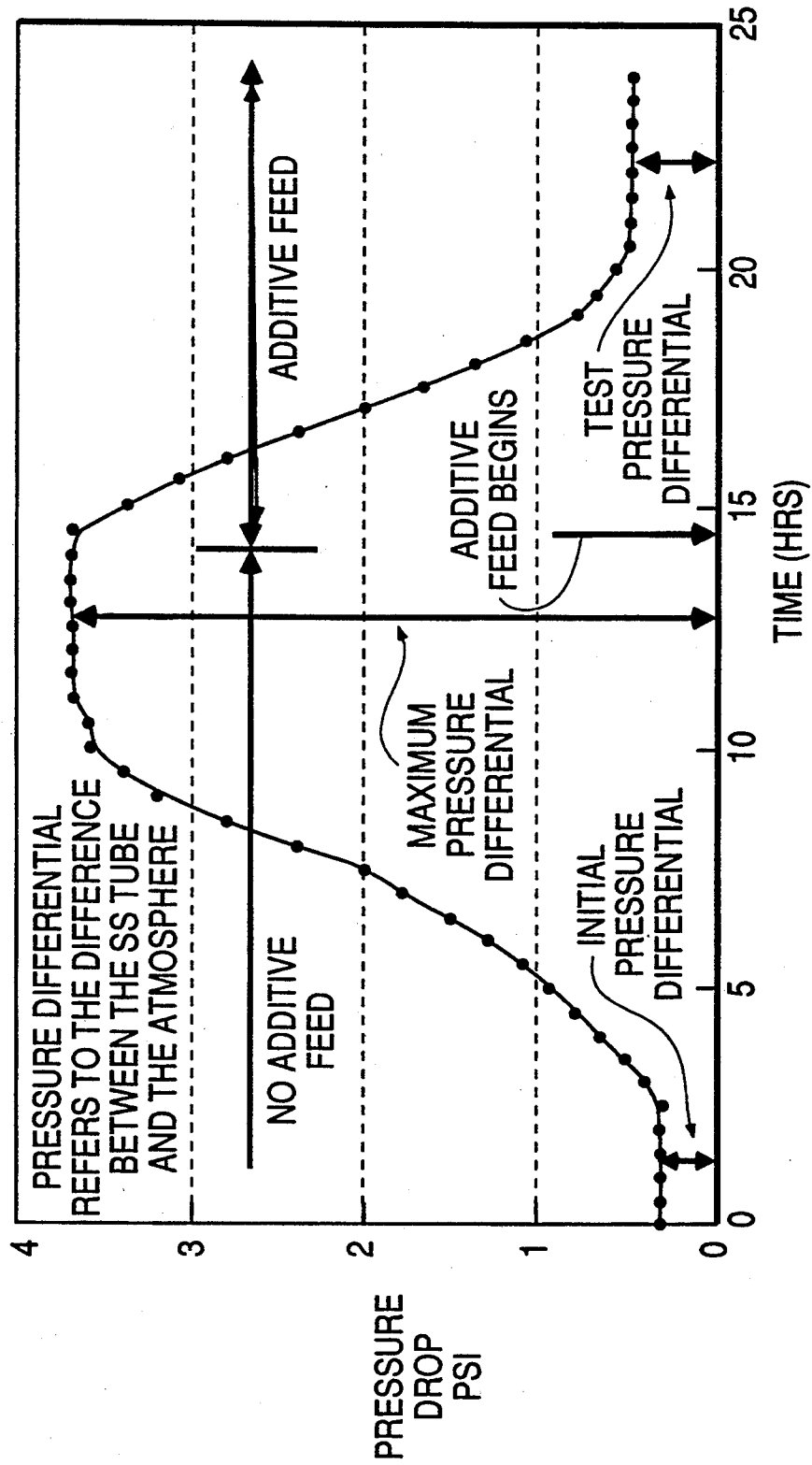

METHODS FOR REMOVING BIOFILM FROM OR PREVENTING BUILDUP THEREOF ON SURFACES IN INDUSTRIAL WATER SYSTEMS

This application is a continuation of application Ser. No. 07/654,007 filed Feb. 12, 1991, now abandoned.

BACKGROUND OF THE INVENTION

1. Field of the Invention

Biological fouling on surfaces is a serious economic problem in many commercial and industrial aqueous process and water handling systems. The fouling is caused by a biomass which is the buildup of microorganisms and/or extracellular substances and by dirt or debris that become trapped in the biomass. Bacteria, fungi, yeasts, diatoms and protozoa are only some of the organisms which cause buildup of a biomass. If not controlled, the biofouling caused by these organisms can interfere with process operations, lower the efficiency of processes, waste energy and reduce product quality.

Cooling water systems used in power-generating plants, refineries, chemical plants, air conditioning systems and other commercial and industrial operations frequently encounter biofilm problems. Biofilm is the buildup of layers of organisms. Cooling water systems are commonly contaminated with airborne organisms entrained by air/water contact in cooling towers as well as waterborne organisms from the systems makeup water supply. The water in such systems is generally an excellent growth medium for these organisms. If not controlled, the biofilm biofouling resulting from such growth can plug towers, block pipelines and coat heat transfer surfaces with layers of slime, and thereby prevent proper operation and reduce equipment efficiency.

Industrial processes subject to problems with biofouling include those used for the manufacture of pulp, paper, paperboard and textiles, particularly water laid nonwoven fabrics. For example, paper machines handle very large volumes of water in recirculating systems called "white water systems". The white water contains pulp dispersion. The furnish to a paper machine typically contains only about 0.5% of fibrous and non fibrous paper making solids, which means that for each ton of paper, almost 200 tons of water pass through the paper machine, most of it being recirculated in the white water system.

These water systems provide an excellent growth medium for microorganisms, which can result in the formation of microbial slime in headboxes, water lines and papermaking equipment. Such slime masses not only can interfere with water and stock flows, but, when they break loose, they can cause spots or holes in the paper as well as web breaks that cause costly disruptions in paper machine operations.

2. Discussion of the Related Art

The control of microbial activity has traditionally been the province of toxic chemicals. Toxic chemical control techniques are well represented in the prior art. U.S. Pat. Nos. 3,959,328, 4,054,542 and 4,285,765 are illustrative of the methods that rely on killing the offending microorganisms with toxic chemicals. Such methods have received the majority of the research effort reported in the prior art because of the logic of eliminating the problem by eliminating the offending organism and because of the large number of organic and inorganic chemicals that will kill microorganisms.

There are certain drawbacks to the use of toxic chemicals. Most of these chemicals that are toxic to microorganisms are also toxic to higher life forms, up to and including humans. The negative effects of these chemicals on the earth's environment and on the food chain is well-documented. Thus any method for controlling microorganisms with toxic chemicals will have some impact on the rest of the population of higher life forms.

The effect of toxic chemicals is, moreover, limited by the organism's own natural defense mechanisms. Planktonic or free-floating organisms are readily destroyed by most chemical agents used to control microorganisms. But sessile, or fixed organisms located on system surfaces, are protected by a polysaccharide covering, and will have some success in warding off the effect of environmental toxins. Thus an increased dose of toxin may well be needed to overcome protection provided by the polysaccharide covering.

Several attempts to control the negative effects of biological activity either avoid the use of toxic chemicals or mitigate their use or impact on the environment. For instance, U.S. Pat. Nos. 3,773,623 and 3,824,184, both to Hatcher et al., disclose the use of the enzyme levan hydrolase to control the formation of bacterial slime in industrial water systems.

U.S. Pat. Nos. 4,055,467 to Christensen, discloses a method for preventing slimes from being deposited on solid surfaces in contact with industrial process waters by using the commercial product, Rhozyme HP 150, which is the enzyme pentosanasehexosanase. This method prevents the buildup of planktonic organisms onto the sessile layers of organisms which are then able to secrete a polysaccharide outer layer. Rhozyme HP-150 is, however, not designed to attack the already accumulated layers of slime that are protected by the polysaccharide cover. These polysaccharides reduce the rate of penetration of the enzyme into the mass of bacteria.

A combination of enzyme and surface active agent has been used in the field of fabric cleaning and stain removal for many years. U.S. Pat. Nos. 3,519,379 to Blomeyer et al. discloses a soaking and laundering process in which a proteolytic enzyme and a peroxy compound are employed along with an organic detergent and an alkaline builder to achieve superior stain removal. U.S. Pat. Nos. 3,985,686 to Barrat, discloses an enzymatic detergent composition containing, inter alia, cationic and anionic surface-active agents and enzymes, particularly proteases.

Blomeyer et al. and Barrat deal with the removal of hydrophobic soil and stains. While the soil and stains are organic, they are not directly biological in their origin and are not in the industrial water system environment. Soil and stain technology relies to some degree on the use of an oxidizing compound to remove the organic material. Oxidizing compounds that have been used to achieve proper control in industrial water systems include chlorine or a chlorine derivative or substitute.

There are references in technical literature to the use of the combination of enzymes and surface active materials to control the growth of biofilm on reverse osmosis membranes used for purification of water (Argo, David G. et al., *Aqua Sci. Tech. Rev.*, "Biological Fouling of Reverse Osmosis Membranes" Vol 6, 1982, pp. 481–491; Whittaker, C. et al., *Applied and Environmental Microbiology*, "Evaluation of Cleaning Strategies for Removal of Biofilms from Reverse-Osmosis Membranes" Vol 48(2), August 1984, pp. 395-403). The membranes are porous structures made of cellulose acetate.

The single species of microorganism, however, found by Argo et al. and, in the later study identified as greater than 95% Mycobacterium by Whittaker et al., is different from the species that are most prevalent on substrates in industrial systems. The biological reason for this difference is that the cellulose acetate substrate in a spiral wound reverse osmosis membrane is more hospitable to Mycobacterium than to the general class of bacterial organisms found in industrial systems.

The environment studied in the prior art, therefore, was much different than the environment found in most industrial systems that would produce a mixed microflora. In fact, European Patent application number WO 90/02794 by Novo-Nordisk discloses that an enzyme that is required for a specific polysaccharide will be specific to that organism.

Whittaker et al., moreover, noted a marked decrease in the effectiveness of their treatment programs with the increasing age of the microfloral population. This implies that the organisms were able to resist the treatment more effectively as their numbers increased.

Argo et al. disclose that systems treated with chlorine were more effectively treated with the enzyme program. Whittaker et al. observed that the use of a commercial cleaning product containing certain enzymes, surface active compounds and bleach was the most effective in controlling biofilm of those tested. Whittaker et al. also notes, however, that no treatment or combination of treatments was completely effective or effective at all stages of biofilm development. Argo additionally points out that no cleaner tested consistently removed all the biofilm from all the membranes.

U.S. Pat. Nos. 4,936,994 to Wiatr discloses a method of removing slime from slime-covered surfaces of cooling towers with an enzyme preparation which combines the activities of cellulase, alphaamylase and protease. Wiatr requires the combination of the three enzymes and sets forth at column 3, lines 41-44, that none of the enzymes alone would remove enough slime to be effective.

U.S. Pat. 4,684,469 to Pedersen et al. and U.S. Pat. No. 4,370,199 to Orndorff both disclose methods for controlling biofilm with an enzyme-catalyzed biocide. These methods do not eliminate the use of a toxicant, but merely use the enzyme component to improve the performance of a toxic chemical.

SUMMARY OF THE INVENTION

The present invention relates to a composition of matter and a method for removing a biomass or biofilm from a solid substrate or preventing buildup of a biomass or biofilm on a solid substrate, and particularly complex biomass or biofilm (hereafter, the term "biofilm" will include both biomass and biofilm), in water systems without requiring the use of chemicals that are toxic to humans, fish, or even the slime-forming microorganisms responsible for the biofouling problem. The present invention, however, can be used in combination with such chemicals.

Particularly, the present invention relates to a combination of at least two biologically produced enzymes and at least one surfactant (wetting agent), particularly anionic surfactant, in an amount effective to destroy the polysaccharide material binding the biofilm, particularly a complex biofilm, together. The inventive method can expose the individual organisms that make up the film, and allow them to be washed away, thus exposing more polysaccharide and more microorganisms to the process. Thus the method can both reduce the thickness of the deposit and prevent a deposit from forming.

The inventors have also discovered that by adding a surfactant for penetrating and dispersal purposes, performance of the invention can be improved, and the formulation can be more effective over a broader range of conditions. Specifically, the subject invention can perform at both alkaline and acidic pH levels. The types of surfactants useful in the present invention can include anionic and nonionic surfactants, preferably anionic surfactants.

The inventors have in particular discovered highly preferred combinations of biologically produced enzymes to chemically react with and destroy polysaccharides that are specific to the types of organisms that create the problems of retarded heat transfer and plugging in industrial systems. In addition, the inventors have discovered highly preferred surfactants that are highly effective in penetrating the protective layer around the organisms which cause the problems in industrial systems.

The present invention can distinguish between the microbial ecologies of planktonic organisms and sessile organisms. It is known that the free energy of a given surface will determine which living organisms attach to that surface. Metals, such as steel and copper, glass, porcelain or other smooth, hard surfaces will selectively promote the development of fundamentally different organisms than will soft plastic or polymeric surfaces (Fletcher, Madilyn et al. *Applied and Environmental Microbiology*, "Influence of Substratum Characteristics on the Attachment of a Marine Pseudomonad to Solid Surfaces", January 1989, pp. 67-72). The inventors have studied several types of bacteria obtained from actual aqueous systems, to determine which bacteria are present on a given surface.

Specifically, the inventors used a test protocol with a mixed microbiological population that is representative of a realistic complex ecosystem highly resistant to chemical decomposition strategy. The organisms were, in fact, isolated from actual problem situations to provide a better measure of the effect of biofilm mitigation in industrial water systems. Thus the present invention is designed to correctly diagnose the target organisms that are responsible for biofilm development and to chemically attack the polymeric binding agents that protect these specific types of organisms. Such microorganisms include bacteria, including blue-green forms.

Correct combinations of enzymes for industrial systems require attention to the kind of organisms typically troublesome in specific industrial systems. Particular attention is paid to the types of organisms which are troublesome to materials used to make heat transfer surfaces, for example: glass, plastic and metal such as stainless steel, mild steel, copper alloys, and the like.

Thus the present invention can provide a sophisticated system of biological enzymes and surfactants that can actually control the growth of complex biological films on hard surfaces and remove living organisms from the film.

Advantageously, the present invention can effectively remove organisms regardless of the age of the population. This is of particular importance in systems where the development of new growth of microorganisms is constantly in progress and where the consequence of a failure to adequately address a problem early enough can have a very significant economic impact on system performance.

Another advantage to the present invention is the compatibility of the enzyme system with known removal methods, including those methods which use an oxidizer or oxidant such as chlorine, bromine, peroxide or ozone. Advantageously, however, the present invention does not require the presence of the chemicals of prior art methods to work.

Finally, the inventors discovered that cellulase was ineffective on the subject organisms of the testing protocol.

BRIEF DESCRIPTION OF THE DRAWINGS

FIG. 2 is a conceptual plot of the output of the device.

DETAILED DESCRIPTION OF THE INVENTION

Figure 1:
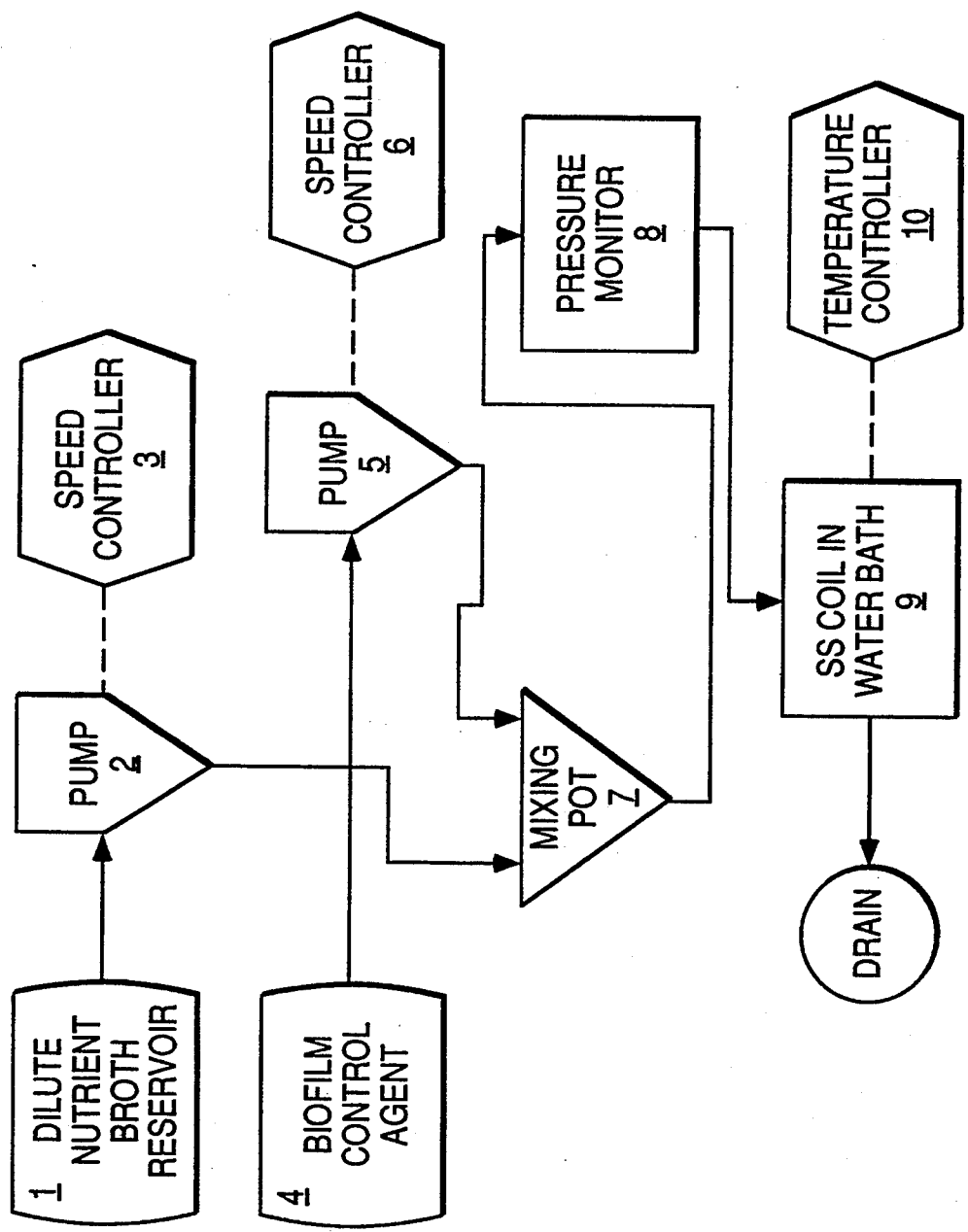
FIG. 1 shows a device for measuring and recording pressure drop.

The inventors have discovered a method and composition for removing accumulated layers of sessile microorganisms from and/or preventing a buildup of sessile microorganisms on solid substrates in an industrial water system. The water system is contacted, preferably flushed, with (1) at least one acidic protease or alkaline protease, (2) at least one glucoamylase or alpha amylase, and (3) at least one surfactant, wherein the combination of (1), (2) and (3), preferably in the form of a water solution, is capable of destroying polysaccharide material which surrounds the sessile microorganisms, particularly bacteria.

The acidic protease or glucoamylase may be derived from *Aspergillus niger*. The alkaline protease or alpha amylase may be derived from *Bacillus subtilis*. Further the acidic or alkaline protease may be derived from pineapple stem.

Representative acidic or alkaline proteases that are useful in this invention include endopeptidases. The HT-PROTEOLYTIC-L-175 commercial product by Solvay Enzyme Products Incorporated is an example of an alkaline protease, and its activity has been demonstrated both in slightly acidic and slightly alkaline biofilm solutions.

Another enzyme component includes the glucoamylases and alpha amylases. The DIAZYME L-200 commercial product by Solvay Enzyme Products Incorporated is an example of a glucoamylase. Its activity has been demonstrated both in acidic and slightly alkaline biofilm solutions.

Diazyme L-200 has been given the chemical name (1,4-alpha-D-Glucan glucohydrolase) by American Chemical Society Standards as a way of describing its general activity which has been observed. Hydrolases catalyze reactions involving hydrolysis.

Glucohydrolase indicates that specific substrates attacked are of polysaccharide and oligosaccharide substrate types, where the kind of linkage that is attacked is glycosidic hydrolysis. Glucoamylase activity indicates that the hydrolysis is directed at starch moieties connected by glycosidic linkages within a complex polysaccharide.

In actuality, glucohydrolase activity is directed at alpha-D-1,6-glycosidic and alpha-D-1,4-glycosidic linkages. It just happens that starch, dextrins, amylopectin, and other oligosaccharides, as well as polysaccharides, are composed of these linkages; therefore, where the monosaccharide, glucose, is within the larger polysaccharide or oligosaccharide moieties, glucose will be liberated in all these cases. Hence, glucoamylase and glucohydrolase indicate glucose liberation by hydrolysis.

A preferable combination of enzymes is HT-PROTEOLYTIC-L-175 and DIAZYME L-200.

The surfactant can be, for example, anionic or nonionic, preferably anionic. Examples of anionic surfactants useful in the present invention are ether alcohol sulfates and alkylaryl sulfonates, e.g., dodecylbenzenesulfonic acid.

The combination of enzymes and at least one surfactant in accordance with the present invention can be fed either together or separately to the water system at feedrates preferably varying from 1 part per million parts of the water to be treated to 100 parts per million parts of water to be treated. The ratio between the individual components can preferably vary between 10 percent surfactant and 90 percent combined enzyme and 10 percent combined enzyme and 90 percent surfactant. The ratio between the at least one protease enzyme and the at least one glucoamylase or alpha amylase enzyme can preferably vary from 10:1 to 1:10.

A particularly preferred embodiment is a combination of equal proportions of each of the three components, (1) at least one acidic protease or alkaline protease, (2) at least one glucoamylase or alpha amylase and (3) at least one surfactant, preferably anionic. Thus a feeding solution is preferably made to a convenient feeding strength containing equal doses of each of the three components.

This particularly preferred feeding solution is added to the water to be treated so that each component achieves a concentration in the water to be treated of about 20 parts per million parts of water to be treated. At this concentration, the solution can significantly reduce the biofilm layer within a period of 2-3 hours. Lower concentrations of additives can be used to accomplish the same result but the period of exposure of the biofilm is longer. Conversely, if the concentration of the enzyme mixture is higher, the biofilm layer can decay more rapidly.

Significant differences in performance in some of the enzymes were discovered when the system pH was changed by less than a single pH unit across the neutral boundary. Different enzymes were sometimes necessary to achieve good control of the biofilm. Armed with the disclosure of the specification, one skilled in the art can readily figure out appropriate enzymes/surfactant combinations to treat a particular biofilm.

EXAMPLES

Slimeforming microorganisms were obtained from a papermill water system. These microorganisms were identified as the bacterial species *PSEUDOMONAS AERUGINOSA, KLEBSIELLA OXYTOCA* and *ENTEROBACTER CLOACAE*. These bacteria both singly and in combination produced viscous slime adherent films upon surfaces in 18-24 hours when grown in a supporting nutrient environment. Artificial growth media were developed which would support the growth and slime production by these bacterial species in both slightly acidic and slightly alkaline solution conditions. These growth media were of the following formulations:

TABLE 1

ALKALINE GROWTH MEDIUM

| COMPONENT | MG SOLIDS/LITER |
| --- | --- |
| CELLULOSE FINES | 1000 |
| CALCIUM CARBONATE | 1000 |
| SOLUBLE POTATO STARCH | 2000 |
| MONOPOTASSIUM PHOSPHATE | 500 |
| DIPOTASSIUM PHOSPHATE | 500 |
| AMMONIUM NITRATE | 1000 |
| MAGNESIUM SULFATE | 500 |
| NUTRIENT BROTH (FROM DIFCO LABS) | 500 |
| TOTAL SOLIDS/LITER OF MAKEUP WATER | 7000 |
| pH | 7.4 |

TABLE 2

ACID GROWTH MEDIUM

| COMPONENT | MG SOLIDS/LITER |
| --- | --- |
| CELLULOSE FINES | 1000 |
| CALCIUM CHLORIDE | 100 |
| KAOLIN CLAY | 450 |
| TITANIUM DIOXIDE | 450 |
| SOLUBLE POTATO STARCH | 2000 |
| MONOPOTASSIUM PHOSPHATE | 500 |
| DIPOTASSIUM PHOSPHATE | 500 |
| AMMONIUM PHOSPHATE | 1000 |
| MAGNESIUM SULFATE | 500 |
| NUTRIENT BROTH (FROM DIFCO LABS) | 500 |
| TOTAL SOLIDS/LITER OF MAKE UP WATER | 7000 |
| pH | 6.6 |

These growth media were sterilized in an autoclave. Upon cooling, these growth solutions were poured into sterile 250 ml Erlenmeyer flasks to a volume of approximately 200 ml. Presterilized glass slides of approximately 1×3 in. dimensions were aseptically submerged into each sterile flask. The bacterial species previously mentioned were separately cultured in these nutrient solutions and each was added as 0.1 ml to the sterile flask solutions. Inoculated solutions were then incubated for 18–24 hours at approximately 35 degrees C. Excellent, uniform bacterial slime films were produced on the glass slide surfaces within the incubation time of 18–24 hours.

Visual physical presence of the biofilm was made evident by the use of an artificial electron acceptor 2-(p-iodophenyl)-3-(p-nitrophenyl)-5-phenyltetrazolium chloride (INT DYE). This dye would color uniform biofilms a deep red within minutes. Evidence of uniform biofilm was visible within minutes. In the presence of such biofilms, a stable colored formazan product was formed which could not easily be removed from the glass surface by means of normal handling. This method was used to determine the effectiveness of chemical treatment to remove biofilm.

The following data were generated using this bacterial biofilm model. Degrees of excellence in biofilm destabilization and removal were visually determined by a scoring system which related the approximate percentage of biofilm remaining after treatment when compared to controls. Biofilm adherence was graded by the amount of reacted "INT" tetrazolium present on glass surfaces as compared to controls.

Legend for Scoring Glass Slide Treatments

Biofilm adherence to glass surfaces were scored as follows:

Where:
0 = No perceived visual biofilm present.
1 = 10% of slide surface area visually covered with "INT DYE".
2 = 20–40% of surface area visually covered with "INT DYE".
3 = 40–60% of surface area visually covered with "INT DYE".
4 = 60–80% of surface area visually covered with "INT DYE".
5 = 80–100% of surface area visually covered with "INT DYE".

At the beginning of each experiment all glass surfaces were covered with biofilm. The final score relates the amount of biofilm remaining or "not removed" during the static treatment. Consequently treatments which achieved scores of 2 or 1 were considered very successful biofilm mitigating treatments.

Contact times were approximately 18 hours unless otherwise indicated. Growth media solutions were either pH 6.6 (slightly acid) or pH 7.4 (slightly alkaline). Static conditions were maintained which eliminated flow turbulence as a contributing factor to biofilm removal.

EXAMPLE 1

| SAMPLE TREATMENT | ACID SOLUTION BIOFILM | ALKALINE SOLUTION BIOFILM |
| --- | --- | --- |
| CONTROL | 5 | 5 |
| TRYPSIN | 4 | 3 |
| PROTEASE (STREPTOMYCES) | 4 | 3 |
| INVERTASE (YEAST) | 3 | 2 |
| TENASE L-34 | 1 | 5 |
| TENASE L-1200 | 1 | 5 |
| BURCOTASE AL-25 | 3 | 4 |
| BURCOTASE AL-25 | 3 | 4 |
| ALCALASE DX | 3 | 4 |
| HT-PROTEOLYTIC-L-175 | 1 | 2 |
| AMYLOGLUCOSIDASE | 1 | 1 |
| MILEZYME APL 440 | 1 | 1 |
| MAXTASE LS 400,000 | 4 | 2 |
| MAXTASE ML 320,000 | 4 | 4 |
| MAXAMYL WL 7000 | 2 | 4 |
| MAXACAL L 300,000 | 4 | 5 |
| MILEZYME AFP 2000 | 1 | 1 |
| BROMOLAIN 1:10 | 1 | 1 |
| DIAZYME L-200 | 1 | 1 |

EXAMPLE 2

| SAMPLE TREATMENT | ACID SOLUTION BIOFILM | ALKALINE SOLUTION BIOFILM |
| --- | --- | --- |
| CONTROL | 5 | 5 |
| CETYLPYRIDINIUM CHLORIDE | 5 | 5 |
| HEXADECYLTRIMETHYL-AMMONIUM BROMIDE | 5 | 5 |
| BENZETHONIUM CHLORIDE | 5 | 5 |
| CHAPS | 3 | 3 |
| LUBROL PX | 2 | 2 |
| TRITON X-100 | 2 | 3 |
| ALGINIC ACID | 4 | 5 |
| N-LAUROYLSARCOSINE | 2 | 1 |
| 1-DECANESULFONIC ACID | 2 | 2 |
| SODIUM DODECYL SULFATE | 1 | 1 |
| DODECYLBENZENESULFONIC ACID | 1 | 1 |

EXAMPLE 3

| SAMPLE TREATMENT | ACID SOLUTION BIOFILM | ALKALINE SOLUTION BIOFILM |
|---|---|---|
| CONTROL | 5 | 5 |
| DODECYLBENZENE-SULFONIC ACID + HT-PROTEOLYTIC-L-175 | 0 | 0 |
| DODECYLBENZENE-SULFONIC ACID + AMYLOGLUCOSIDASE | 0 | 0 |
| SODIUM DODECYL SULFATE + HT-PROTEOLYTIC-L-175 | 0 | 1 |
| SODIUM DODECYL SULFATE + AMYLOGLUCOSIDASE | 0 | 1 |
| DODECYLBENZENE-SULFONIC ACID + DIAZYME L-200 | 0 | 0 |
| SODIUM DODECYL SULFATE + DIAZYME L-200 | 0 | 0 |

EXAMPLE 4

SEMI-PURIFIED CONCENTRATE (CRUDE) GLUCO-AMYLASE AS 1,4-ALPHA-D GLUCAN GLUCOHYDRALASE
LEGEND: (<10%) MEANING LESS THAN 10% OF CONTROLS REMAINED AS OBSERVABLE BIOFILM AT THAT POINT IN TIME

| HR | 250 PPM | 100 PPM | 50 PPM | 10 PPM |
|---|---|---|---|---|
| 1 | <10% | — | — | — |
| 2 | <10% | — | — | — |
| 3 | <10% | <10% | — | — |
| 4 | <10% | <10% | — | — |
| 5 | <10% | <10% | — | — |
| 6 | <10% | <10% | — | — |
| 18 | <10% | <10% | <10% | — |
| 24 | <10% | <10% | <10% | <10% |

EXAMPLE 5

SEMI-PURIFIED CONCENTRATE (CRUDE) HT-PROTEOLYTIC-L-175 BACTERIAL PROTEASE

| HR | 250 PPM | 100 PPM | 50 PPM | 10 PPM |
|---|---|---|---|---|
| 1 | <10% | — | — | — |
| 2 | <10% | — | — | — |
| 3 | <10% | <10% | — | — |
| 4 | <10% | <10% | — | — |
| 5 | <10% | <10% | — | — |
| 6 | <10% | <10% | — | — |
| 18 | <10% | <10% | <10% | <20% |
| 24 | <10% | <10% | <10% | <10% |

EXAMPLE 6

BIOFILM MITIGATION WITH BIOLOGICAL ANIONIC DETERGENTS

| | SODIUM DODECYL SULFATE | | | | DODECYL BENZENESULFONIC ACID | | | |
|---|---|---|---|---|---|---|---|---|
| HR | 250 PPM | 100 PPM | 50 PPM | 10 PPM | 250 PPM | 100 PPM | 50 PPM | 10 PPM |
| 1 | <20% | — | — | — | <20% | | | |
| 2 | <20% | — | — | — | <20% | | | |
| 3 | <10% | — | — | — | <10% | | | |
| 4 | <10% | — | — | — | <10% | | | |
| 5 | <10% | <20% | — | — | <10% | <20% | | |
| 6 | <10% | <20% | — | — | <10% | <20% | | |
| 18 | <10% | <10% | <10% | <10% | <10% | <10% | <10% | <10% |
| 24 | <10% | <10% | <10% | <10% | <10% | <10% | <10% | <10% |

EXAMPLE 7

COMBINATION OF DODECYLBENZENESULFONIC + GLUCOHYDROLASE + HT-PROTEOLYTIC-L-175 BACTERIAL PROTEASE
LEGEND: (%) OF CONTROLS; WHERE (A) = DODECYLBENZENESULFONIC (B) = GLUCOHYDROLASE (C) = HT-PROTEOLYTIC-L-175

| HR | A 100 ppm B 50 ppm C 50 ppm | A 100 ppm B 10 ppm C 10 ppm | A 50 ppm B 10 ppm C 10 ppm | A 10 ppm B 10 ppm C 10 ppm |
|---|---|---|---|---|
| 1 | <10% | <20% | | |
| 2 | <10% | <10% | <20 | |
| 3 | <10% | <10% | <10% | <20% |
| 4 | <10% | <10% | <10% | <10% |

In Example 1 a wide variety of enzymes were used as treatments which produced an equally wide response in results. Not all types of enzymes were effective as slime destabilizers. For instance, HT-PROTEOLYTIC-L-175, AMYLOGLUCOSIDASE, MILEZYME APL 440, MILEZYME AFP 2000, BROMOLAIN 1:10, DIAZYME L-200, TENASE L-340 and TENASE L-1200 outperformed all other enzyme treatments as adherent slime mitigators in acid solution biofilm. Notable, was the fact that TENASE L-340 and TENASE L-1200 lost their activity in the alkaline solution. Thus of the eighteen enzymes tested in Example 1, six showed very excellent biofilm mitigation properties (1 or 2) in both slightly acidic and slightly alkaline slime. Among these six enzymes, MILEZYME AFP 2000, BROMOLAIN 1:10 and HT-PROTEOLYTIC-L-175 are proteases which share the property of being capable of hydrolyzing the interior peptide bonds of proteins. All three have broad substrate specificity and remain active at a variable pH range. AMYLOGLUCOSIDASE and DIAZYME L-200 (a type of glucoamylase) are enzymes which are capable of hydrolyzing both the linear and branched glucosidic linkages of starch and oligosaccharides resulting in essentially quantitative yields of glucose. These enzymes catalyze the hydrolysis of both the alpha-D-1,6-glucosidic branch points and the predominating linear alpha-D-1,4-glucosidic linkages.

No bactericidal activity was observed with these enzymatic treatments. However, only 10% of the surface area as compared to controls exhibited adherent biofilm with any of these respective enzymatic treatments. (Except HT-PROLEOLYTIC-L-175 exhibited 20-40% of the surface area in the alkaline solution.)

Example 2 shows that among a cross section of detergents only a few of the anionic surfactants exhibited the capability of static biofilm removal under both slightly acidic and slightly alkaline conditions. SODIUM DODECYL SULFATE and DODECYLBENZENESULFONIC ACID allowed only 10% of the biofilm to remain on the glass slide surface. It was observed that these anionic surfactants did not produce any bactericidal effect by the use of plate count agar enumeration.

Example 3 shows that complete removal of acid solution and alkaline solution biofilm was observed with various combinations of enzymes and surfactants (with the exception of SODIUM DODECYLSULFATE with either HT-PROTEOLYTIC-L-175 or AMYLOGLUCOSIDASE.) There was clear indication that the combination of specific enzymes and specific surfactants are superior at film removal than either alone.

Examples 4 and 5 show that 50 ppm of both GLUCOAMYLASE and HT-PROTEOLYTIC-L-175 PROTEASE can achieve 90% or more biofilm removal in 18 hours. Likewise both SODIUM DODECYL SULFATE and DODECYLBENZENESULFONIC ACID at 50 ppm removed all but 10% of the biofilm in 18 hours as shown in Example 6. However, Example 7 shows that 10 ppm of each active enzyme and DODECYLBENZENESULFONIC ACID at 10 ppm consistently produced at least 90% removal of film in only 4 hours.

Biofilm Removal Under Heat Transfer Conditions

To evaluate the effect of a biological control method in an industrial heat exchanger, appropriate microorganisms were grown in a heat exchange tube and their effect on some property of the system, such as pressure drop or heat transfer coefficient, was measured.

A device for measuring and recording pressure drop is shown schematically in FIG. 1. Peristaltic pump 2 feeds a nutrient broth from reservoir 1 and peristaltic pump 5 feeds a biofilm control agent 4 into common mixing pot 7. The peristaltic pumps 2 and 5 can be independently controlled by speed controllers 3 and 6, respectively. The resulting mixture is taken from the mixing pot and pumped into a pressure transducer 8 and then to a stainless steel coil 9 which is submerged in a temperature controlled water bath and can be maintained at any temperature between ambient and 95° C. by temperature controller 10. For the current test protocol, the tube was type 316 SS and had a 1.0 mm inside diameter and a length of 1.0M. The tube temperature was maintained at 35° C.

Each test run was begun with an inoculation of the tube section alone. This was done by injecting a nutrient broth containing a large concentration of two bacterial species, *Pseudomonas aeruginosa* and *Enterobacter cloacae*. Both of these organisms are known for their ability to generate a thick slime layer which is difficult to penetrate. The inoculating solution contained from $10^6$ to $10^9$ organisms per ml of solution. It was fed by syringe directly to the SS tube section over a 1 hour period. After inoculation, the SS tube was connected to the mixing chamber so that the output of the peristaltic pumps would travel through the mixing chamber and ultimately pass through the SS tube. The liquid fed through peristaltic pump A was a dilute, sterile nutrient broth made from a dehydrated concentrate from Difco Laboratories. The concentration was 800 mg/1, made in sterile DI water. This composition was rich enough to support healthy growth of bacteria in the test coil but limit the growth of bacteria in other parts of the system where the inoculation had not taken place.

Each run was measured by comparing the pressure differential in the untreated tube with pressure in the tube when there was a control scheme in place. The formula for calculating the pressure reduction is as follows:

$$\% \ REDUCTION = [1 - (P_t - P_i / P_m - P_i)] * 100$$

Where:
$P_t$ = pressure differential of the test;
$P_m$ = maximum pressure without additive;
$P_i$ = initial pressure difference.

The measurement of these values is presented in the conceptual plot of the output of the test device (FIG. 2). Example 8 shows the effect of the treatment program.

EXAMPLE 8

The additive blend is a combination of DODECYLBENZENE-SULFONIC ACID, GLUCOHYDROLASE and HT-PROTEOLYTIC-L-175.

| TEST SOLUTION/ Feedrate (PPM) | PRESSURE DROP (PSI) Test/Max/ Initial | PERCENT PRESSURE REDUCTION | TEST NUMBER |
|---|---|---|---|
| Additive Blend/ 20 ppm each component | 0.6/2.9/0.5 | 96% | 1 |
| Additive Blend/ 40 ppm each component | 0.6/3.5/0.3 | 91% | 2 |
| Glucoamylase/40 PPM | 1.4/1.6/0.6 | 20% | 3 |
| Proteoase/40 PPM | 1.7/1.9/0.6 | 15% | 4 |
| Detergent/40 PPM | 1.5/1.9/0.6 | 31% | 5 |
| Chlorine/1 ppm | 1.4/1.9/0.6 | 38% | 6 |
| No Treatment | 3.5/3.5/0.6 | — | 7 |

PRESSURE DROP REDUCTION DURING ENZYME TREATMENT

Test 1 shows the reduction in pressure caused by the use of 20 ppm of both of the enzymes and a similar level of the wetting agent. Test 2 shows the pressure reduction caused by treatment with 40 ppm of both of the enzymes in combination with 40 ppm of the wetting agent. Tests 3, 4, 5 and 6 show the effect of the single components (at 40 ppm) and Chlorine (1.0 ppm) used alone. Test 7 is a test run without any control additive.

It is clear from the table that the mixture of the three components produced a significantly larger reduction in the slime layer than did either of the three components fed alone at the same rate. The combination showed a 91 percent pressure reduction and the individual components produced only 15 percent to 31 percent reduction in pressure drop.

We claim:
1. A method of removing a biofilm from a solid substrate or preventing buildup of a biofilm on a solid substrate, said biofilm being formed by at least one sessile microorganism in a water system comprising the step of contacting a water system in recognized need of such removal or prevention with a composition consisting essentially of (1) at least one acidic protease or alkaline protease, (2) at least one glucoamylase or alpha amylase, and (3) at least one surfactant, said combination of (1), (2), and (3) being capable of destroying polysaccharide material which surrounds the sessile microorganisms.

2. The method of claim 1, wherein said combination of (1), (2), and (3) is in the form of a water solution.

3. The method of claim 2, wherein said microorganism is a bacterium.

4. The method of claim 2, wherein (1) is at least one acidic protease derived from *Aspergillus niger*.

5. The method of claim 2, wherein (1) is at least one alkaline protease derived from *Bacillus subtilis*.

6. The method of claim 2, wherein (2) is at least one alpha amylase derived from *Bacillus subtilis*.

7. The method of claim 2, wherein (2) is at least one glucoamylase derived from *Aspergillus niger*.

8. The method of claim 2, wherein said (1) at least one protease acidic or alkaline protease is derived from pineapple stem.

9. The method of claim 2, wherein at least one of said acidic protease or alkaline protease is an endopeptidase.

10. The method of claim 2, wherein at least one of said surfactant is an anionic surfactant.

11. The method of claim 10, wherein said anionic surfactant is an ether alcohol sulfate or an alkylaryl sulfonate.

12. The method of claim 11, wherein said anionic surfactant is an alkylaryl sulfonate and is dodecylbenzenesulfonic acid.

13. The method of claim 11, wherein said anionic surfactant is an ether alcohol sulfate and is sodium dodecyl sulfate.

14. The method of claim 2, wherein said (1) at least one acidic protease or alkaline protease, said (2) at least one glucoamylase or alpha amylase and said (3) at least one surfactant are of equal proportions.

15. The method of claim 2, wherein at least one of said acidic protease or alkaline protease is HT-PROTEOLYTIC-L-175.

16. The method of claim 2, wherein at least one of said glucoamylase or alpha amylase is DIAZYME L-200.

17. The method of claim 2, wherein at least one of said glucoamylase or alpha amylase is amyloglucosidase.

18. The method of claim 2, wherein said water is white water.

19. The method of claim 2, wherein said water pH is alkaline.

20. The method of claim 2, wherein said water pH is acidic.

21. The method of claim 2, wherein said water system is part of a paper machine and associated equipment.

22. The method of claim 2, wherein said water system is a cooling system comprising water storage, clarification, transfer and heat exchange equipment.

23. The method of claim 2, wherein said water system is a water purification system comprising water storage, clarification, purification, and transfer equipment.

24. The method of claim 2 wherein said water system is a mill supply system wherein the water solution is used for cooling, steam generation, domestic supply and processing.

25. The method of claim 2, wherein said substrate comprises a copper alloy, mild steel, stainless steel, glass, porcelain or plastic.

* * * * *